US012609772B2

(12) United States Patent
Zhou et al.

(10) Patent No.: US 12,609,772 B2
(45) Date of Patent: Apr. 21, 2026

(54) PHASE-FOLDING COHERENT OPTICAL TECHNOLOGY FOR OPTICAL COMMUNICATION

(71) Applicant: Google LLC, Mountain View, CA (US)

(72) Inventors: Xiang Zhou, Sunnyvale, CA (US); Cedric Fung Lam, San Carlos, CA (US); Hong Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 260 days.

(21) Appl. No.: 18/434,168

(22) Filed: Feb. 6, 2024

(65) Prior Publication Data

US 2025/0253955 A1      Aug. 7, 2025

(51) Int. Cl.
*H04B 10/61* (2013.01)

(52) U.S. Cl.
CPC ................................. *H04B 10/6166* (2013.01)

(58) Field of Classification Search
CPC .................................................. H04B 10/6166
USPC .......................................................... 398/212
See application file for complete search history.

(56) References Cited

U.S. PATENT DOCUMENTS

| | | | |
|---|---|---|---|
| 9,300,400 B2 | 3/2016 | Liu et al. | |
| 10,461,967 B1 * | 10/2019 | Ahmed et al. | ......... H04B 10/61 |
| 10,979,148 B1 * | 4/2021 | Zhou et al. | ............ H04B 10/61 |
| 11,689,292 B2 | 6/2023 | Zhou et al. | |
| 2007/0264029 A1 * | 11/2007 | Suzuki et al. | ......... H04B 10/04 398/188 |
| 2009/0074427 A1 * | 3/2009 | Iiu | ........................... H04B 10/06 398/205 |
| 2011/0236033 A1 | 9/2011 | Kikuchi | |
| 2022/0278752 A1 * | 9/2022 | Zhou et al. | .......... H04B 10/532 |
| 2023/0283380 A1 | 9/2023 | Zhou et al. | |

FOREIGN PATENT DOCUMENTS

WO            2020248737 A1      12/2020

OTHER PUBLICATIONS

Extended European Search Report for European Patent Application No. 25154623.0 dated Jul. 1, 2025. 10 pages.
Zhang et al. 200 Gbit/s/A PDM-PAM-4 PON system based on intensity modulation and coherent detection. Journal of Optical Communications and Networking, IEEE, USA, vol. 12, No. 1, Jan. 1, 2020 (Jan. 1, 2020), DOI: 10.1364/JOCN.12.0000A1, 8 pages.

(Continued)

*Primary Examiner* — Kenneth N Vanderpuye
(74) *Attorney, Agent, or Firm* — Lerner David LLP

(57) ABSTRACT

The technology is generally directed to a coherent optical system that performs phase folding for one-dimensional coherent optical signals using a first optical coupler configured to output a first signal portion and a second signal portion, a second optical coupler to receive the first signal portion through a first branch and the second signal portion through a parallel second branch, and a phase-folding time delay unit including at least a first time delay component positioned on the first branch and a second time delay component positioned on the second branch. An output of the second optical coupler is a phase-folded version of the one-dimensional modulated optical signal that is capable of being demodulated by a one-dimensional vector receiver.

20 Claims, 8 Drawing Sheets

200

(56) References Cited

OTHER PUBLICATIONS

Xiaobo Xie, Fatih Yaman, Xiang Zhou, and Guifang Li, Polarization Demultiplexing by Independent Component Analysis, IEEE Photonics Technology Letters, vol. 22, No. 11, Jun. 1, 2010, pp. 805-807.
Xiang Zhou, Cedric Fung Lam, Hong Liu, U.S. Appl. No. 63/543,331, filed Oct. 10, 2023.

* cited by examiner

100

200

310

340

From Transmitter

Polarization and Phase Folding Unit

Optical Coupler

TIA

ADC

Partial Response Coherent DSP

Local Oscillator 350    360    370

330

320

300

400

500

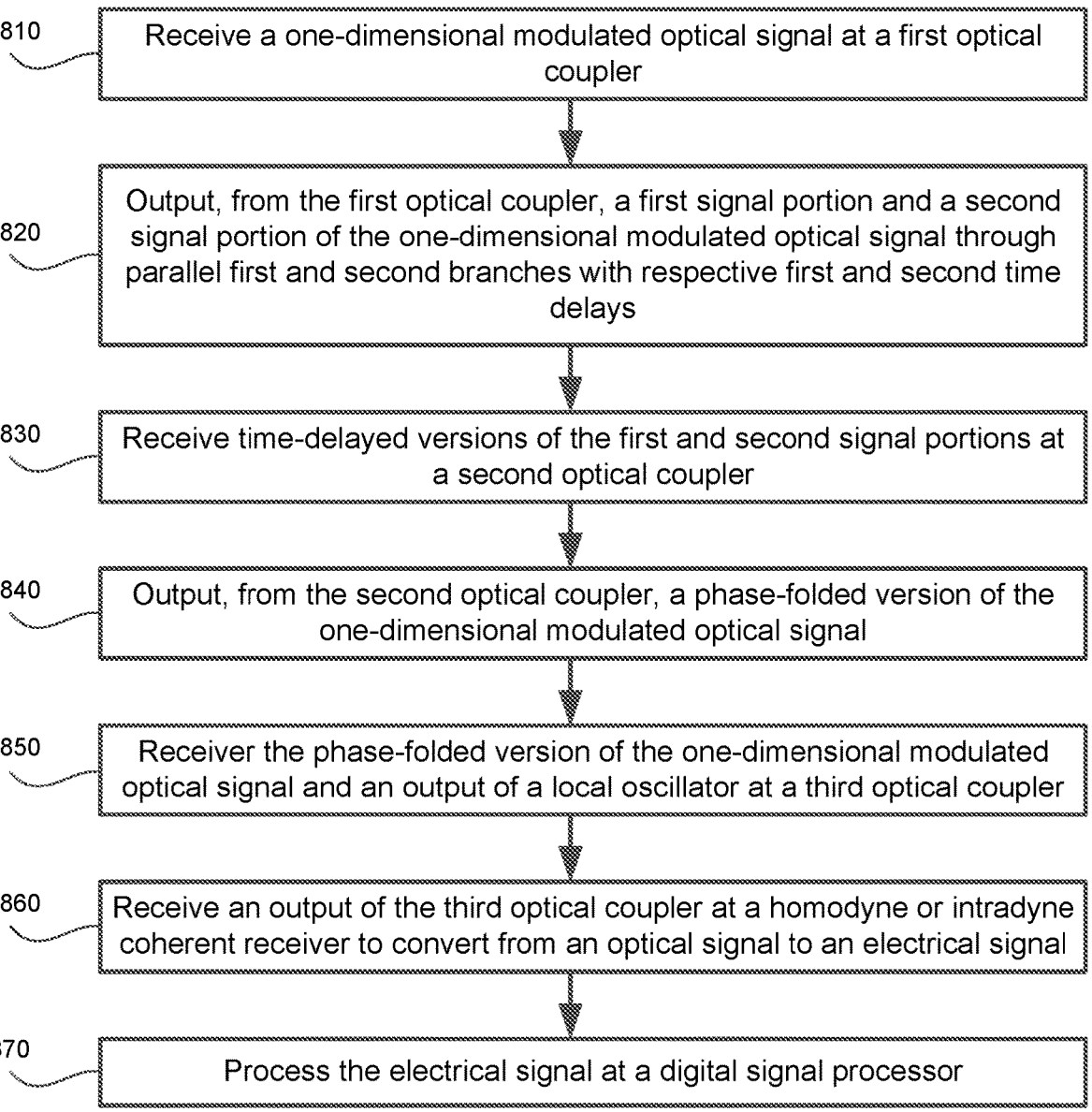

810 — Receive a one-dimensional modulated optical signal at a first optical coupler 820 — Output, from the first optical coupler, a first signal portion and a second signal portion of the one-dimensional modulated optical signal through parallel first and second branches with respective first and second time delays 830 — Receive time-delayed versions of the first and second signal portions at a second optical coupler 840 — Output, from the second optical coupler, a phase-folded version of the one-dimensional modulated optical signal 850 — Receiver the phase-folded version of the one-dimensional modulated optical signal and an output of a local oscillator at a third optical coupler 860 — Receive an output of the third optical coupler at a homodyne or intradyne coherent receiver to convert from an optical signal to an electrical signal 870 — Process the electrical signal at a digital signal processor

PHASE-FOLDING COHERENT OPTICAL TECHNOLOGY FOR OPTICAL COMMUNICATION

BACKGROUND

Coherent optical communication technology typically involves modulating the amplitude and phase of light that is transmitted across two polarization states to transport information over a fiber optic cable. Coherent optical communication technology offers the potential to use more of the available bandwidth of a fiber optic cable or other such transmission paths than competing technologies. In a coherent receiver, the transmitted signal is interfered with using a local oscillator (LO) such that phase information can be extracted from the transmitted signal.

As compared to other forms of optical transmission, such as intensity modulation and direct detection (IM-DD), coherent optical communication technology generally has advantages, such as higher receiver sensitivity, higher spectral efficiency (SE), and higher tolerance towards various linear optical impairments such as fiber chromatic dispersion (CD) and polarization mode dispersion (PMD). In applications where the state of polarization (SOP) is not maintained during transmission, a phase- and polarization-diversity four-dimensional (4D) vector receiver is typically employed to detect and demodulate the coherently modulated signal. 4D refers to the separate in-phase (I) and quadrature (Q) components of the X-polarized signal and Y-polarized signal, commonly referred to as Ix, Qx for the X-polarized signal, and Iy, Qy for the Y-polarized signal. A coherently modulated signal that is demodulated by a 4D vector receiver is separated into I, Q for each of the X and Y polarized signals. A 4D vector receiver is also typically used when the received signal is only a two-dimensional (2D) modulated optical signal, such as a single polarization (SP) quadrature amplitude modulated (QAM) (SP-QAM) signal or a one-dimensional (1D) modulated signal such as a SP-pulse amplitude modulation (SP-PAM) signal.

However, in some applications, such as short-reach transmission systems, using 4D vector receivers to detect and demodulate coherently modulated optical signals is not necessary, and the extra components of the 4D vector receiver, as opposed to a simpler and smaller receiver, can add unwanted size, cost, and noise to the communication system.

BRIEF SUMMARY

The present disclosure described a system that uses a relatively simpler and smaller receiver than in typical 4D vector receivers to detect and demodulate coherently modulated optical signals. The receiver may be capable of demodulating 1D modulated optical signals with a single set of optical-to-electrical components (e.g., photodetector, amplifier, analog-to-digital converter), as opposed to more complex receivers that require multiple sets of optical-to-electrical components feeding into the same digital signal processor.

One aspect of the disclosure is directed to a coherent optical system including: a first optical coupler configured to receive a one-dimensional modulated optical signal and output a first signal portion on a first branch and a second signal portion on a second branch; a phase-folding time delay unit including at least a first time delay component positioned on the first branch and a second time delay component positioned on the second branch; and a second optical coupler configured to receive the first signal portion from the first branch and the second signal portion from the second branch and output a phase-folded version of the one-dimensional modulated optical signal capable of being demodulated by a one-dimensional vector receiver.

The first optical coupler may be configured to receive a single-polarization pulse-amplitude modulated optical signal, whereby an output of the second optical coupler is a phase-folded version of the single-polarization pulse-amplitude modulated optical signal that is capable of being demodulated by a one-dimension vector receiver. The first time delay component may apply a time delay equal to one or a multiple of a symbol period of the modulated optical signal, and the second time delay component may apply a time delay phase-shifted 90 degrees from the time delay of the first time delay component.

The system may further include: a local oscillator of the receiver; a third optical coupler configured to combine the output of the second optical coupler with an output of the local oscillator; a photodetector configured to convert an output of the third optical coupler to an electrical signal; an amplifier configured to amplify the electrical signal; an analog to digital converter (ADC) configured to convert the electrical signal into digital form; and a digital signal processor (DSP) configured to execute a partial-response signal recovery algorithm on the electrical signal in digital form. The third optical coupler may feed the phase-folded version of the one-dimensional modulated optical signal to the DSP through only one photodetector, one amplifier and one ADC. The partial-response signal recovery algorithm may include a maximum likelihood sequence estimation (MLSE). The first optical coupler, the phase-folding time delay unit, and the second optical coupler may be included in a receiver.

The system may further include: a polarization beam splitter configured to split the one-dimensional modulated optical signal into each of an X-polarized portion and a Y-polarized portion; and a polarization-folding time delay unit including at least a third time delay component positioned to apply a time delay to the X-polarized portion different from the time delays of the first and second time delay components. An output of the polarization-folding time delay unit may be connected to an input of the first optical coupler. The output of the second optical coupler may be both a polarization-folded and phase-folded version of the one-dimensional modulated optical signal and capable of being demodulated by a one-dimensional vector receiver. The time delay of the third time delay component may be a symbol period longer than the time delay of the first time delay component.

The system may further include: a local oscillator of the receiver; a third optical coupler configured to combine the output of the second optical coupler with an output of the local oscillator; a photodetector configured to convert an output of the third optical coupler to an electrical signal; an amplifier configured to amplify the electrical signal; an analog to digital converter (ADC) configured to convert the electrical signal into digital form; and a digital signal processor (DSP) configured to execute a partial-response signal recovery algorithm on the electrical signal in digital form. The third optical coupler may feed the polarization- and phase-folded version of the one-dimensional modulated optical signal to the DSP through only one photodetector, one amplifier and one ADC.

The system may further include: a local oscillator of the receiver; a third optical coupler configured to split an output of the local oscillator; a fourth optical coupler configured to receive a first portion of the output of the second optical coupler and a first portion of the output of the third optical coupler; a fifth optical coupler configured to receive a second portion of the output of the second optical coupler and a second portion of the output of the third optical coupler; a first photodetector configured to convert an output of the fourth optical coupler to a first electrical signal; a first amplifier configured to amplify the first electrical signal; a first analog to digital converter configured to convert the first electrical signal into digital form; a second photodetector configured to convert an output of the fifth optical coupler to a second electrical signal; a second amplifier configured to amplify the second electrical signal; a second analog to digital converter configured to convert the second electrical signal into digital form; and a digital signal processor configured to execute a partial-response signal recovery algorithm on the first and second electrical signals in digital form. The system may be configured to receive a two-dimensional modulated optical signal, and output from the second optical coupler a polarization-folded and phase-folded version of the two-dimensional modulated optical signal that is capable of being demodulated by a two-dimensional vector receiver. The first optical coupler may be configured to receive a polarization-multiplexed pulse-am-plitude modulated optical signal, whereby an output of the second optical coupler is a phase-folded version of the polarization-multiplexed pulse-amplitude modulated optical signal that is capable of being demodulated by a two-dimension vector receiver. The second optical coupler may be configured to output respective orthogonal components of the polarization-multiplexed pulse-amplitude modulated optical signal to the fourth optical coupler and the fifth optical coupler.

The first optical coupler, the phase-folding time delay unit, and the second optical coupler may be included in a transmitter. The system may further include: an optical signal source included in the transmitter and configured to output an unmodulated optical signal; and a one-dimen-sional modulator included in the transmitter and configured to modulate the unmodulated optical signal and output the one-dimensional modulated optical signal. The system may further include a receiver configured to receive the phase-folded version of the one-dimensional modulated optical signal from the second optical coupler, the receiver includ-ing: a local oscillator; a third optical coupler configured to combine the phase-folded version of the one-dimensional modulated optical signal with an output of the local oscil-lator; a photodetector configured to convert an output of the third optical coupler to an electrical signal; an amplifier configured to amplify the electrical signal; an analog to digital converter (ADC) configured to convert the electrical signal into digital form; and a digital signal processor (DSP) configured to execute a partial-response signal recovery algorithm on the electrical signal in digital form.

Another aspect of the disclosure is directed to a method including: receiving, by a first optical coupler, a one-dimen-sional modulated optical signal; outputting, by the first coupler coupler, a first signal portion and a second signal portion of the one-dimensional modulated optical signal, the first signal portion being passed through a first branch including a first time delay component and the second signal portion being passed through a second branch parallel to the first branch and including a second time delay component; receiving, by a second optical coupler, a time-delayed ver-sion of the first signal portion and the second signal portion; and outputting, by the second optical coupler, a phase-folded version of the one-dimensional modulated optical signal that is capable of being demodulated by a one-dimensional vector receiver.

The method may further include: combining, by a third optical coupler, the phase-folded version of the one-dimen-sional modulated optical signal with an output of a local oscillator; converting, by a homodyne or intradyne coherent receiver, an output of the third optical coupler to a digital signal; and executing, by a digital signal processor, a partial-response signal recovery algorithm on the digital signal.

BRIEF DESCRIPTION OF THE DRAWINGS

FIG. 8 is a flow diagram illustrating an example method in accordance with aspects of the disclosure.

DETAILED DESCRIPTION

Overview

Figure 1:
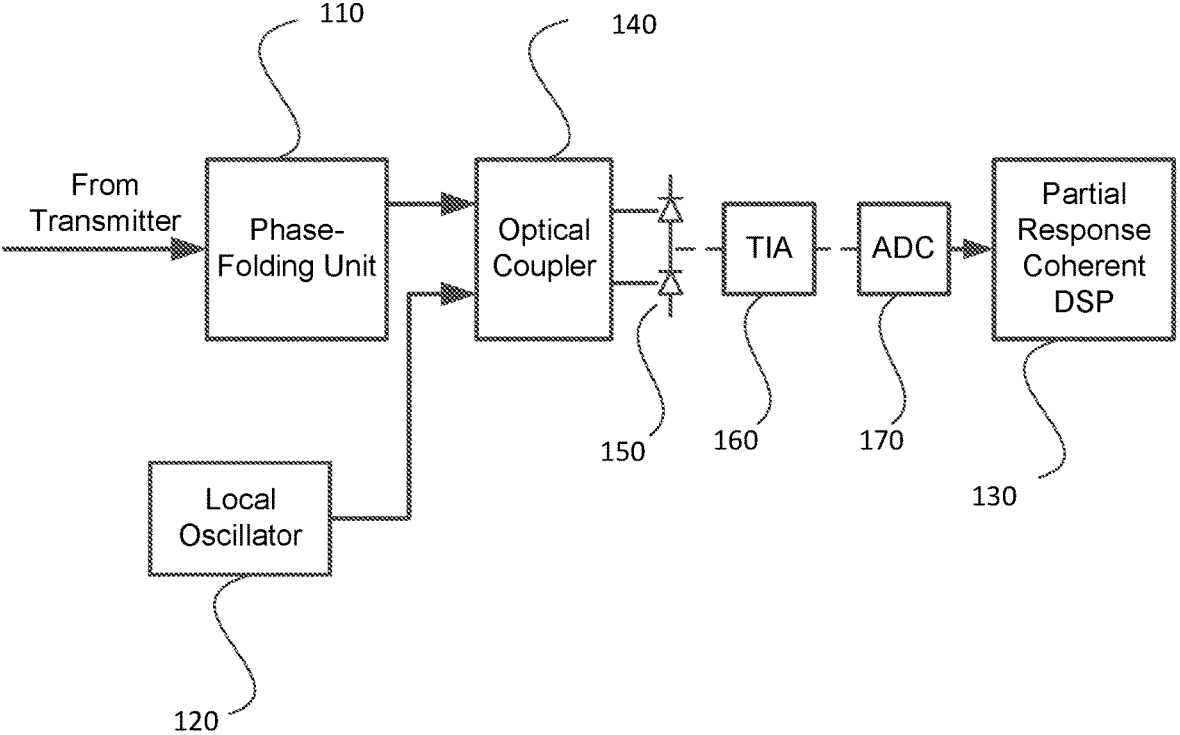
FIG. 1 is a block diagram of an example receiver system in accordance with aspects of the disclosure.

The technology is generally directed to coherent optical systems in which optical signals are encoded using the phase and amplitude of the signals. A pulse-amplitude modulated (PAM) signal is converted from being a spatially-diverse signal to a time-diverse signal by splitting the signal and then rotating the different portions of the split signal. This process is referred to herein as "phase folding." Phase-folding circuitry may include an optical coupler for splitting the signal, one or more time delay elements for inserting a time delay into at least one of the branches output from the optical coupler, and a second optical coupler to fold the branched signals together to form a time-diverse signal.

In the case of single-polarization PAM signals (SP-PAM), the SP-PAM signal may be phase-folded and provided to a homodyne/intradyne receiver, which converts the phase-folded signal from the optical domain to the digital domain using a balanced photodetector, an amplifier, and an analog-to-digital converter (ADC). The digital signal may then be processed using a digital signal processor. The phase-folded signal is advantageous over the original SP-PAM signal because it can be handled by a simplified receiver consisting of only one balanced photodetector, one amplifier, and one ADC, as opposed to the four sets of protodetectors, ampli-fiers and ADCs normally used in 4D receivers. This is because the phase-folded signal acts as a one-dimensional (1D) modulated optical signal capable of being handled by a 1D receiver.

In some examples, the phase-folding circuitry may be combined with polarization-folding circuitry in order to provide both phase folding and polarization folding for a modulated optical signal. A combined phase-folding and polarization-folding component may include two folding stages. Typically, the polarization-folding stage is provided first, and includes a polarization beam splitter (PBS) to split the signal between X and Y polarizations, a time delay component applied to one of the X or Y polarizations, and a first optical coupler to fold the X and Y polarizations back together. The phase-folding stage receives the output of the first stage, splits the received signal into two branches, and applies time delays to both branches in order to increase the time-diversity of the signal. The time-delayed branches are then folded back together using a second optical coupler. It should be noted that the first optical coupler may be a 2×2 coupler capable of performing both the signal folding of the first stage and the signal splitting of the second stage in a single component.

The phase-folding circuitry may be included in either the transmitter or the receiver of the coherent optical system. In the receiver, the phase-folded signal may be mixed with a signal from a local oscillator (LO) producing a coherent optical signal having a known phase and frequency. Mixing may be performed in an optical coupler, and the output may be provided to the homodyne/intradyne receiver for conversion to a digital signal. In the transmitter, the phase-folding circuitry may be connected to an output of a Mach-Zehnder Modulator (MZM) to produce the phase-folded PAM signal. The phase-folded signal may then be received at the receiver, mixed with the signal of the LO at the receiver, and fed to the homodyne/intradyne receiver for conversion to a digital signal.

The example phase-folding circuitry of the present disclosure is beneficial for providing low-cost coherent modulation for 1D or 2D data transmissions. Such low-cost options may be useful for short-reach transmission systems in which high spectral efficiency (SE) is less critical than in long-haul optical networks. For example, to scale datacenter interconnects from 200 Gb/s per wavelength IM-DD based technology to 400 Gb/s per wavelength coherent technology, a 1D SP-PAM modulation format could be a more cost-effective and more efficient choice of modulation as compared to a 4D polarization-multiplexed quadrature amplitude modulation (PM-QAM) format. This is because modulation of the 1D SP-PAM requires only a single MZM, whereas 4D PM-QAM modulation would require 4 MZMs. Coherent 1D SP-PAM modulation could also be a better choice than 4D PM-QAM modulation for 5G/6G middle/front haul and fiber access networks, in which the required data rate is lower while fiber dispersion (e.g., chromatic dispersion (CD) polarization mode dispersion (PMD) must still be addressed.

Example Systems

FIG. 1 shows an example receiver system 100 with mixed optical and electrical signal processing. The receiver system 100 includes a phase-folding unit 110, a local oscillator ("LO") 120, a digital signal processor ("DSP") 130, an optical coupler ("OC") 140, a balanced photodetector ("PD") 150, a transimpedance amplifier ("TIA") 160, and an analog to digital converter ("ADC") 170.

In operation, the phase-folding unit 110 is configured to receive modulated optical signals from a transmitter (not shown). The phase-folding unit is responsible for spreading the spatial dimensionality of the modulated optical signal across a duration of time. Components of the phase-folding unit 110 for performing this operation are described in greater detail in connection with FIG. 2.

Figure 2:
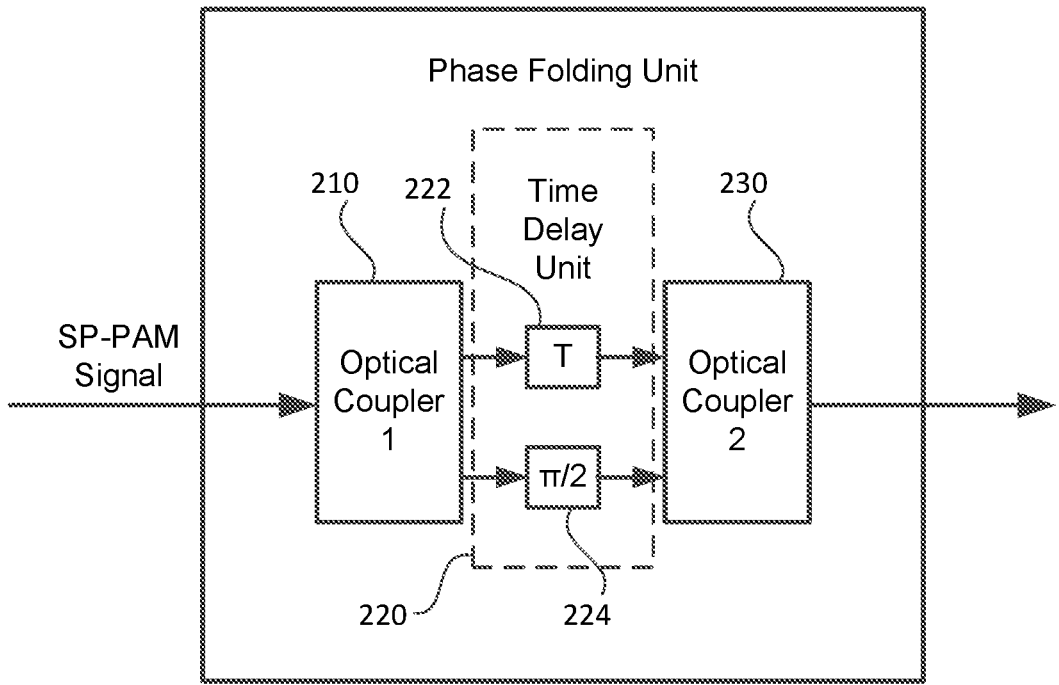
FIG. 2 is a block diagram of an example phase-folding unit in accordance with aspects of the disclosure.

As shown in FIG. 2, an example phase-folding unit 200, such as the phase-folding unit 110 of FIG. 1, includes a first optical coupler 210, a time delay component 220 connected to an output of the first optical coupler 210, and a second optical coupler 230 connected to the respective outputs of the time delay unit 220.

The first optical coupler 210 may be configured to split the incoming transmitter signal into two signals. In some examples, a 3 dB coupler that splits the incoming signal into roughly even parts may be used. Each respective signal may be provided to the time delay unit 220 over a separate branch. The time delay unit 220 may include respective time delay components 222, 224 positioned on the respective branches. For example, in FIG. 2, a first time delay 222 equal to one or multiple symbol periods of the modulated optical signal (represented by "T" herein) is introduced to a first branch of the first optical coupler 210, and a second time delay 224, corresponding to a $\pi/2$ phase difference compared to T (represented by "$\pi/2$" herein), is introduced to a second branch of the first optical coupler 210. Then, the signals of the two branches are folded back into one another at the second optical coupler 230.

Returning to FIG. 1, the local oscillator (LO) 120 may provide an optical signal having a known phase and frequency the LO signal. The LO optical signal may be combined with an output from the phase-folding unit 110 using a single optical coupler 140. When counting the two optical couplers 210, 230 of the phase-folding unit 110 shown in FIG. 2, it should be recognized that the optical coupler 140 of FIG. 1 is a third optical coupler of the receiver 100. Like the first and second optical couplers 210, 230 of FIG. 2, the third optical coupler 140 may also be a 3 dB coupler, which may be configured to combine the respective outputs of the phase-folding unit 110 and the LO 120 approximately evenly.

An output from the third optical coupler 140 may then be passed through the balanced photodiode 150 for optical-to-electrical conversion, then an amplifier 160 for amplification, and then an analog-to-digital converter 170 (ADC) for electrical to digital conversion. The output of the ADC is a digitized electrical signal which may be input to a digital signal processor (DSP) 180 for processing. In some examples, the amplifier 160 may be a trans-impedance amplifier.

The DSP 180 may implement a partial response signal recovery algorithm for the received signal, whereby the receiver can demodulate and detect the contents of the received optical signal. For example, in the case of an SP-PAM signal, the signal may be represented as:

$$\hat{E}_R(t) = \left[ I(t)e^{j\varphi} \right] \hat{x}$$

in which I(t) represents the modulated data, q represents the relative signal laser phase (relative to the LO), and $\hat{x}$ represents the state of polarization. Since the laser phase typically changes relatively slowly, it can be approximated as a constant over a long enough span of time. Therefore, the output of the phase-folding unit can be expressed as follows:

$$E_{R1}(t) = \left[ \frac{1}{2}I(t) - \frac{1}{2}I(t - T)e^{j\frac{\pi}{2}} \right]e^{j\varphi}$$

This demonstrates that the folded signal includes both the original signal I(t) as well as a phase-orthogonal portion with a period delay I(t–T). This allows for relatively simple homodyne/intradyne detection of the signal using a single photodetector, single amplifier, and single analog-to-digital converter, whereby the detected electrical signal $I_r(t)$ may be expressed as follows:

$$I_r(t) = E_L I(t)\sin(\varphi) - E_L I(t - T)\cos(\varphi)$$

in which $E_L$ represents the local oscillator field amplitude, and the phase orthogonal components remain temporarily separated by a symbol period and can be sampled using a single memory tap at two distinct times. Thus, it can be seen from the above equations that the received electrical signal is the equivalent of a two-tap partial-response coded signal that can be recovered by the DSP 180 using known partial-response signal recovery methods such as maximum likelihood sequence estimation (MLSE).

In the example of FIGS. 1 and 2, the polarization of the incoming SP-PAM signal may be known. However, for incoming optical signals for which the polarization is not known, such as if the polarization may change over time, the received optical signal will have an unknown state of polarization at the receiver. In order to resolve the polarization of the optical signal, in FIG. 3, an example receiver 300 is provided with a polarization- and phase-folding unit 310. Components of the polarization- and phase-folding unit 310 are shown in greater detail in connection with FIG. 4. The remaining components of the receiver 300, such as the local oscillator 320, optical coupler, 340, photodetector 350, amplifier 360, analog-to-digital converter 370, and digital signal processor 330, are comparable to the corresponding components of the receiver 100 of FIG. 1.

Figure 3:
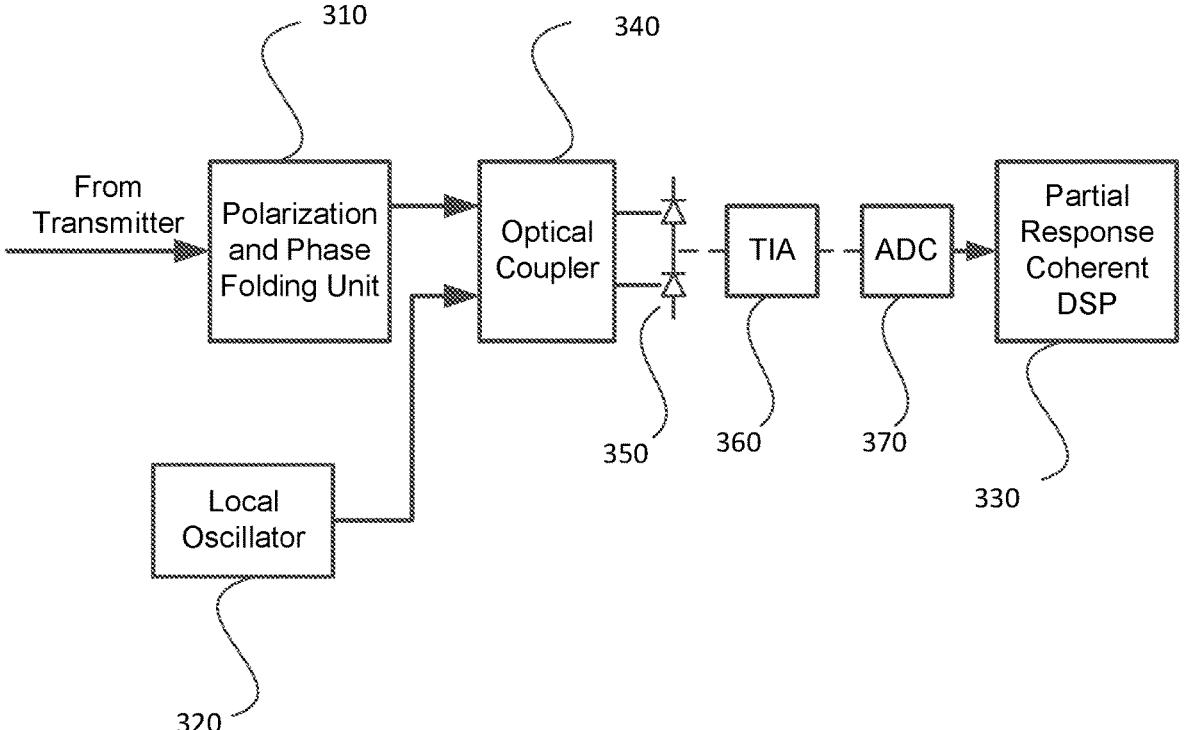
FIG. 3 is a block diagram of another example receiver system in accordance with aspects of the disclosure.
Figure 4:
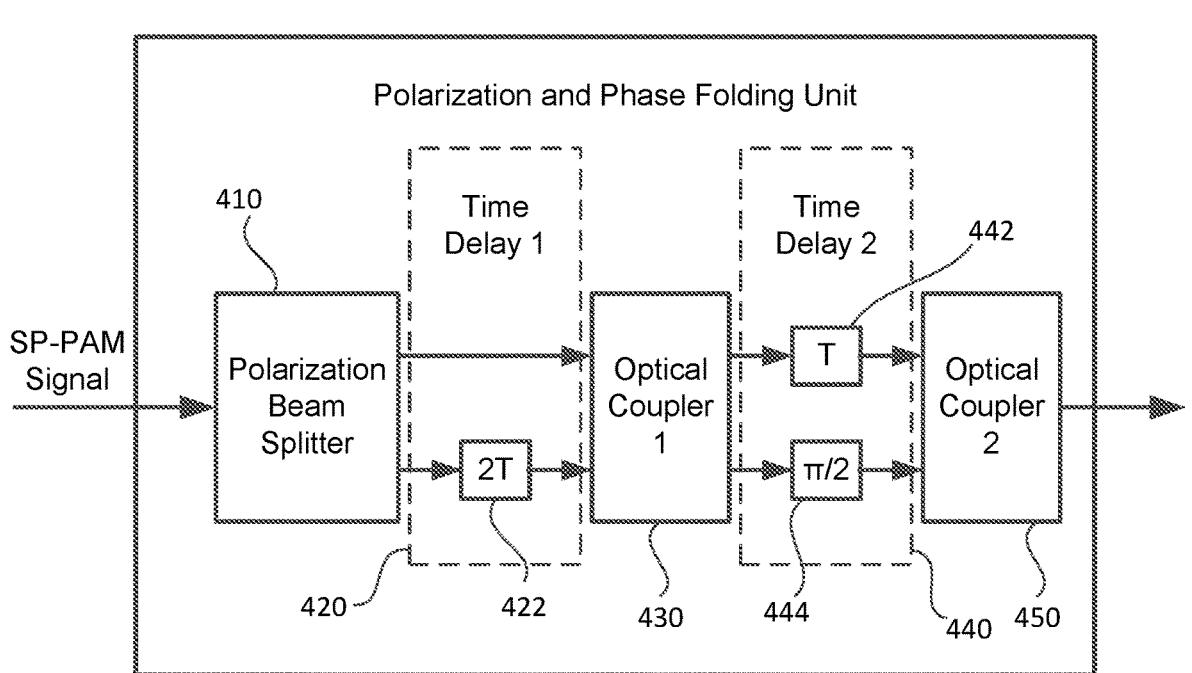
FIG. 4 is a block diagram of an example polarization- and phase-folding unit system in accordance with aspects of the disclosure.

In FIG. 4, an example polarization- and phase-folding unit 400, which may be used as the polarization- and phase-folding unit 310 in the receiver 310 of FIG. 3, is shown. The polarization- and phase-folding unit 400 includes each of a polarization beam splitter 410 (PBS), a first time delay unit 420 connected to an output of the PBS 410, a first optical coupler 430 connected to an output of the first time delay unit 420, a second time delay unit 440 connected to an output of the first optical coupler 430, and a second optical coupler 450 connected to an output of the second time delay unit.

The PBS 410 may be configured to separate the received modulated optical signal into two orthogonal polarization states, e.g., an X-polarized portion and a Y-polarized portion. The PBS 410 may include a polarization rotator to rotate the Y-polarized signal into a X-polarized signal, or vice versa, such that the two outputs of the PBS 410 are at substantially the same state of polarization. Each respective polarized signal may be provided to the first time delay unit 420 over a separate branch.

The first time delay unit 420 may include a time delay component 422 on one of the respective branches. For example, in FIG. 4, a time delay 422 corresponding to two or a multiple-of-two number of symbol periods of the modulated optical signal (represented by "2T" herein) is introduced to a second branch of the PBS 410 output. Then, the signals of the two branches are folded back into one another at the first optical coupler 430. As described in connection with FIG. 2, the first optical coupler 430 may be a 3 dB coupler. The first optical coupler 430 may produce two outputs which are two polarization-folded signals having a 90 degree phase difference between the corresponding X-polarized and Y-polarized components of the original signal received at the PBS 410.

The second time delay unit 440 may receive the two outputs from the first optical coupler 430 along respective branches, and may include a first time delay component 442 on one of the respective branches and a second time delay component 444 on the other of the respective branches. For example, in FIG. 4, a first time delay 442 corresponding to one or a multiple number of symbol periods of the modulated optical signal (represented by "T" herein) is introduced to the first branch of the first optical coupler output. and a second time delay 444 corresponding to a $\pi/2$ phase difference compared to T (represented by "$\pi/2$" herein), is introduced to the second branch of the first optical coupler output. Then, the signals of the two branches are folded back into one another at the second optical coupler 450. The second optical coupler may be a 3 dB coupler, as described in connection with FIG. 2.

Collectively, the PBS 410, first time delay unit 420, and first optical coupler 430 form a first stage of the polarization- and phase-folding unit 400 in which the polarization folding is performed. Similarly, the second time delay unit 440 and the second optical coupler 450 form a second stage of the polarization- and phase-folding unit 400 in which the phase folding is performed. Operation of the second stage is comparable to operation of the phase-folding unit described in connection with FIG. 2. In the example of FIG. 4, the effect of performing phase folding after polarization folding is that the polarization-folded X- and Y-polarized signal components output by the first optical coupler 430 are further phase folded. This allows the output of the second optical coupler to be sent to the simplified homodyne/intradyne coherent receiver shown in FIG. 3.

For a standard single-mode fiber, the polarization matrix linking the output signals to the input signals are unitary and can be modeled as a 2×2 matrix with only two independent polarization angle parameters, $\alpha$ and $\theta$:

$$U = \begin{pmatrix} \cos\alpha & \sin\alpha e^{j\theta} \\ -\sin\alpha e^{-j\theta} & \cos\alpha \end{pmatrix}$$

Thus, for an SP-PAM optical signal $\hat{E}_R(t)$, the signal can be expressed as follows:

$$\hat{E}_R(t) = \cos(\alpha)e^{j\varphi}I(t)\hat{x} - \sin(\alpha)e^{j\varphi}e^{-j\theta}I(t)\hat{y}$$

After the first stage of the polarization- and phase folding unit in which a 2T delay is introduced along one branch, the two polarization components output from the first stage, $E_{Rx}(t)$ and $E_{Ry}(t)$, may be expressed as follows:

$$E_{Rx}(t) = \frac{\sqrt{2}}{2}\cos(\alpha)e^{j\varphi}I(t) - \frac{\sqrt{2}}{2}\sin(\alpha)e^{\varphi}e^{-j\theta+j\frac{\pi}{2}}I(t - 2T)$$

$$E_{Ry}(t) = \frac{\sqrt{2}}{2}\cos(\alpha)e^{j\varphi}e^{j\frac{\pi}{2}}I(t) - \frac{\sqrt{2}}{2}\sin(\alpha)e^{j\varphi}e^{-j\theta}I(t - 2T)$$

The first portion of $E_{Rx}$ and the first portion of $E_{Ry}$ both denote the originally transmitted signal (scaled) with $\pi/2$ phase difference, while the second portions of $E_{RX}$ and $E_{RY}$ denote the 2T-delayed and scaled copies, also with $\pi/2$ phase difference. This indicates the phase orthogonality between $E_{Rx}$ and $E_{Ry}$.

After the second stage of the polarization- and phase-folding unit, in which T and π/2 delays are introduced along respective branches, the phase-folded output from the second stage, $E_{R1}(t)$, may be expressed as follows:

$$E_{R1}(t) = \frac{1}{2}\cos(\alpha)e^{\varphi}I(t-T) - \frac{1}{2}\sin(\alpha)e^{j\varphi}e^{-j\theta+j\frac{\pi}{2}}I(t-3T) -$$
$$\frac{1}{2}\cos(\alpha)e^{j\varphi}e^{j\frac{\pi}{2}}I(t) + \frac{1}{2}\sin(\alpha)e^{j\varphi}e^{-j\theta}I(t-2T)$$

As can be seen from the equation, all four components having a phase difference are now time delayed by different amounts, (t), (t–T), (t–2T) and (t–3T). This allows for relatively simple homodyne/intradyne detection of the signal using a single photodetector, single amplifier, and single analog-to-digital converter, whereby the detected electrical signal $I_r(t)$ may be expressed as follows:

$$I_r(t) = E_L\cos(\alpha)\sin(\varphi)I(t-T) - E_L\sin(\alpha)\cos(\theta-\varphi)I(t-3T) -$$
$$E_L\cos(\alpha)\cos(\varphi)I(t) - E_L\sin(\alpha)\sin(\theta-\varphi)I(t-2T)$$

Thus, it can be seen that the phase orthogonal components of the original signal remain temporarily separated by a symbol period and can be sampled using three memory tap at four distinct times (e.g., at t=0, t=T, t=2T and t=3T). In other words, the received electrical signal is the equivalent of a four-tap partial-response coded signal that can be recovered by the DSP 380 using known partial-response signal recovery methods such as maximum likelihood sequence estimation (MLSE).

In the example of FIG. 4, the PBS 410 is shown as being positioned to receive the incoming optical signal and to feed the X- and Y-polarized portions of the signal to the first and second optical couplers 430, 450. This results in polarization folding occurring prior to phase folding. In other example units, it may be possible to perform phase folding before polarization folding, by placing the first optical coupler 430 upstream of the PBS 410. However, in such an example, it may be necessary to provide two separate PBSs for each of the outputs of the first optical coupler.

Also, in the example of FIG. 4, the polarization- and phase-folding unit is shown as a passive system but in other examples may be an active system. An active system may be, for example, a system that requires a controller and feedback loop. For example, in the case of polarization folding, a polarization controller that includes a PBS, phase shifter, and optical coupler may be an active polarization processing system. The phase shifter may require a feedback control loop to continuously adjust the phase shift to ensure that the output polarization of the active polarization-processing unit is aligned to a target/known polarization, for example, the launched state of polarization at the transmitter side for a communication system. As the temperature and/or mechanical stress conditions of the transmission system (such as the fiber) changes, the received state of polarization of the signal may be altered. The feedback loop may be used to dynamically adjust the phase shift to rotate the state of the polarization of the received signal in order to align to the transmitter signal polarization. In contrast, a passive polarization- and phase-folding unit utilizes a time delay component instead of a phase shifter. The time delay component does not require a feedback loop as the time delay is steady, regardless of changes to the system, e.g., temperature or mechanical stress changes. In other words, the polarization- and phase-folding unit does not perform polarization alignment functions to align the receiver polarization to the transmitter polarization, whereas active polarization processing typically performs polarization alignment functions In the example of FIGS. 3 and 4, the polarization- and phase-folding unit is used for receiving a 1D modulated signal, such as SP-PAM. However, the polarization- and phase-folding unit can have other uses. For example, it can be used to receive some 2D modulation formats, such as a polarization-multiplexed PAM signal (PM-PAM). In such an example, additional receiver components are required but the inclusion of the polarization- and phase-folding unit still enables the overall design to be simplified.

Figure 5:
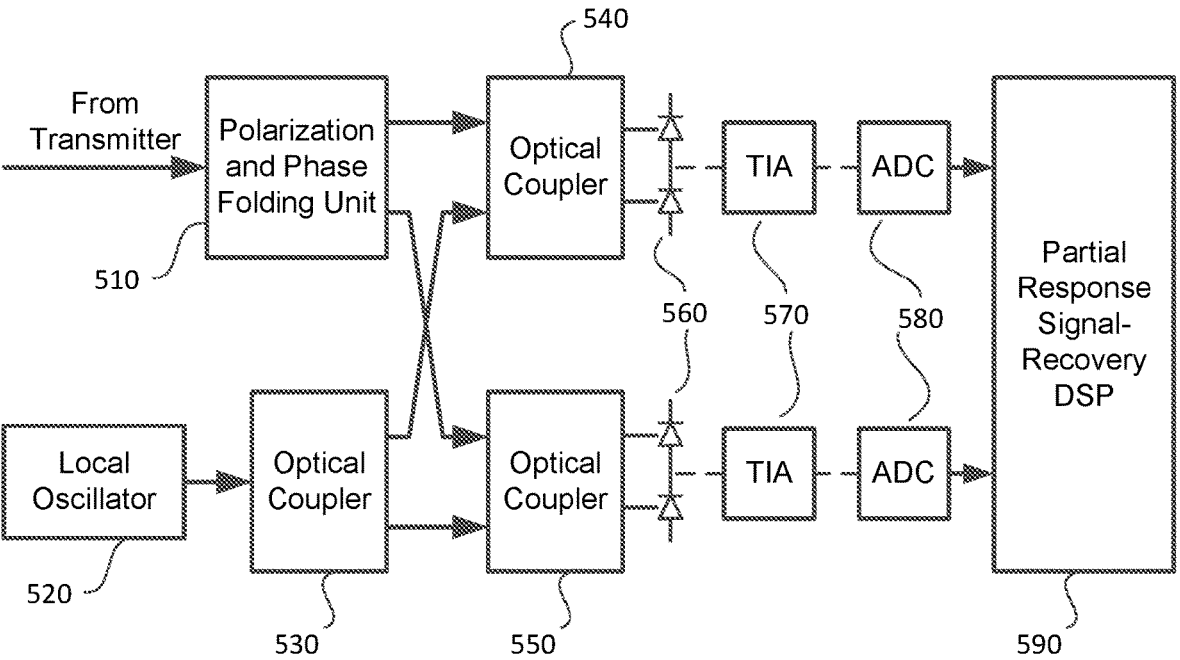
FIG. 5 is a block diagram of another example receiver system in accordance with aspects of the disclosure.

In FIG. 5, an example receiver 500 for receiving 2D signals, such as PM-PAM signals, is shown. The receiver 500 includes a polarization- and phase-folding unit 510, which may be similar to the polarization- and phase-folding unit 400 of FIG. 4 except that the second optical coupler 450 would be configured to provide two outputs instead of one, whereby the two outputs would be the respective orthogonal components of $E_{R1}(t)$, which may be referred to as $E_{R1}(t)$ and $E_{R2}(t)$.

The receiver 500 also includes a local oscillator 520, a third optical coupler 530 connected to an output of the local oscillator 520 and configured to split the local oscillator signal. The receiver also includes fourth and fifth optical couplers 540, 550. The output of the local oscillator is provided to each of the fourth and fifth optical couplers 540, 550. $E_{R1}(t)$ is provided to one of the fourth coupler 540 and $E_{R2}(t)$ is provided to the fifth coupler 550. Outputs of each coupler are then provided to respective sets of a photodetector 560, amplifier 570, and analog-to-digital converter 580 for conversion to respective electrical signals, all of which may be comparable to the photodetectors, amplifiers and converters of other example receivers described herein. The respective electrical signals are then provided to a DSP 590 for processing. The DSP 590 may be configured to perform partial response signal recovery for coherent 2D modulated signals.

Additionally, the above examples generally describe providing a phase-folding unit within a receiver of a transmitter-receiver pair. However, in other examples of the disclosure, the phase-folding unit may be provided within the transmitter, whereby the transmitter signal is already phase-folded before transmission. In some examples, a system that performs phase folding on the transmitter side may take advantage of transmitter-side boost optical amplifiers to compensate for any loss introduced to the optical signal by the phase-folding unit.

Figure 6:
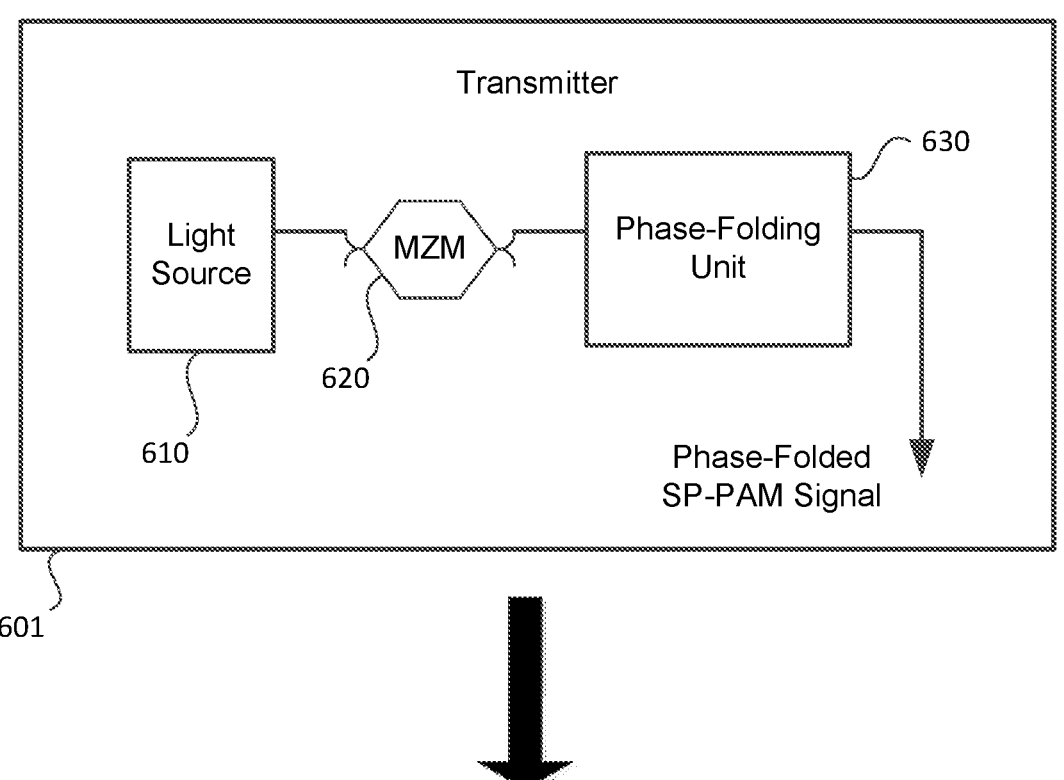
FIG. 6 is a block diagram of an example transmitter/receiver pair system in accordance with aspects of the disclosure
Figure 6:
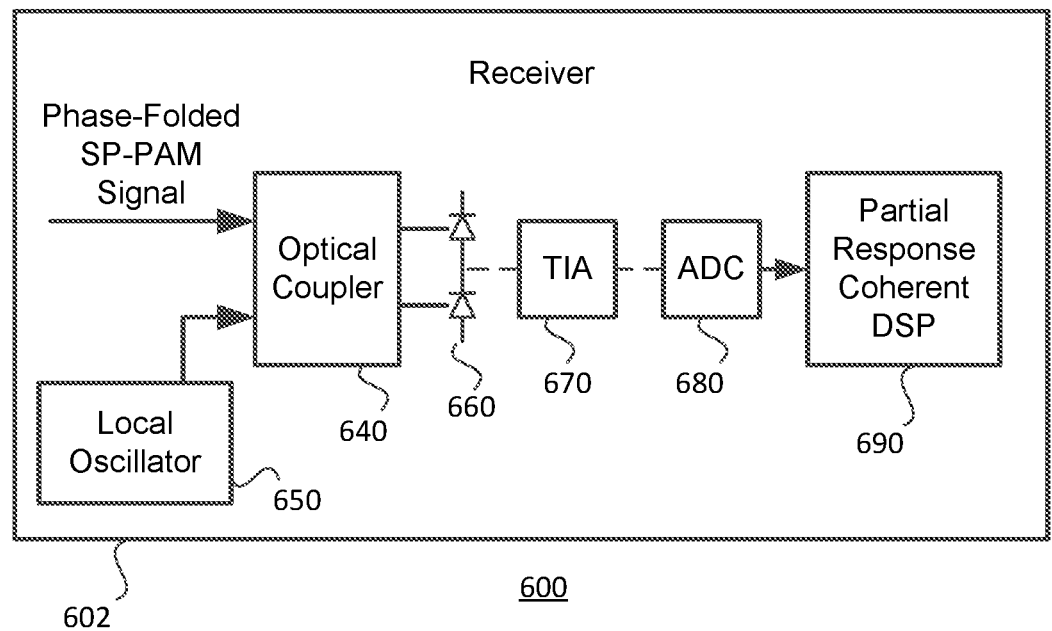

FIG. 6 is a block diagram illustrating an example system 600 including in which a phase-folding unit is included in a transmitter 601 instead of in a receiver 602. The transmitter 601 may include each of an optical signal source 610 such as a laser, and a 1D modulator 620, such as a coherent PAM MZM. The 1D modulator is configured to output one-dimensional single-polarized optical signals, such as SP-PAM. The transmitter 600 also includes a phase-folding unit 630 connected to an output of the 1D modulator 620 and configured to convert the optical signal into a phase-folded optical signal.

The receiver 602 may include an optical coupler 640 for combining the optical signal received from the transmitter 601 with an optical signal received from a local oscillator 650 at the receiver. The optical coupler output may then be provided to a photodetector 660, amplifier 670, and converter 680 for providing an electrical signal that may then be processed by the DSP 690 using a partial response recovery algorithm. The components of the receiver 602 of FIG. 6 may be comparable to the corresponding components described in connection with FIG. 1.

Figure 7:
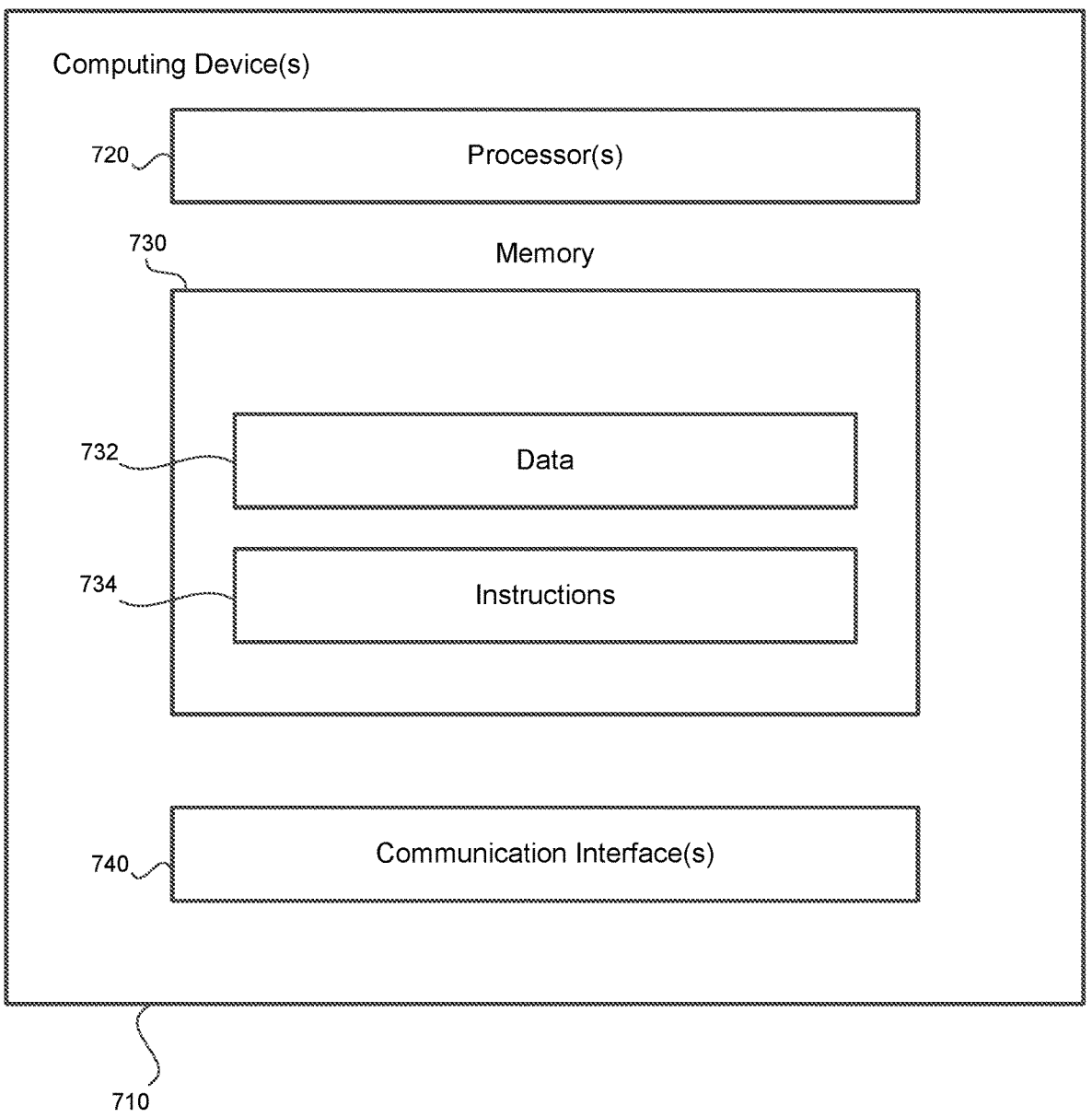
FIG. 7 is a block diagram of an example device in accordance with aspects of the disclosure.

FIG. 7 illustrates an example block diagram of some components in a receiver system, such as receiver system 100, 300 or 500. It should not be considered as limiting the scope of the disclosure or usefulness of the features described herein. In this example, the receiver system is shown with one or more computing devices 710. The computing devices 710 contain one or more processors 720, memory 730 and other components typically present in general purpose computing devices. Memory 730 of the computing devices 710 can store information accessible by the one or more processors 720, including instructions 734 that can be executed by the one or more processors 720.

Memory 730 can also include data 732 that can be retrieved, manipulated or stored by the processor. The memory can be of any non-transitory type capable of storing information accessible by the processor, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. Memory 730 may store information that is accessible by the processors 720, including instructions 734 that may be executed by processors 720, and data 732. For example, the data 732 may include parameters, thresholds, and other values for performing polarization, frequency, and/or phase recovery.

Data 732 may be retrieved, stored, or modified by the one or more processors 720 in accordance with the instructions 734. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 734 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. For instance, the instructions 734 may include functions or methods for performing polarization, frequency, and/or phase recovery.

The one or more processors 720 can be any conventional processor, such as a commercially available CPU. Alternatively, the processors can be dedicated components such as an application specific integrated circuit ("ASIC") or other hardware-based processor. For example, DSP 130 may be configured as the one or more processors 720, with access to memory such as data and instructions. Although not necessary, one or more of the computing devices 710 may include specialized hardware components to perform specific computing processes.

Although FIG. 7 functionally illustrates the processor, memory, and other elements of computing devices 710 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 710. Accordingly, references to a processor, computer, computing device, or memory will be understood to include references to a collection of processors, computers, computing devices, or memories that may or may not operate in parallel. For example, the computing devices 710 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 710 may be capable of directly and indirectly communicating with other transmitter systems and/or receiver systems over a network. Computing devices in a network, such as computing devices 710, may be interconnected using various communication interfaces 740 including protocols and systems, such that computing devices in the network can be part of the Internet, World Wide Web, specific intranets, wide area networks, or local networks. Computing devices in the network can utilize standard communication protocols, such as Internet, World Wide Web, intranets, virtual private networks, wide area networks, local networks, and private networks using communication protocols proprietary to one or more companies. The network can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network, in addition or alternatively, can also support wired connections between the devices and the data center, including over various types of Ethernet connection. Although certain advantages are obtained when information is transmitted or received as noted above, other aspects of the subject matter described herein are not limited to any particular manner of transmission.

Example Methods

FIG. 8 depicts a flow diagram of an example process 800 for receiving an optical signal. The following operations do not have to be performed in the precise order described below. Rather, various operations can be handled in a different order or simultaneously, and operations may be added or omitted.

In block 810, a first optical coupler receives a one-dimensional modulated optical signal. The optical signal may be, for example, an SP-PAM signal.

In block 820, the first coupler may output a first signal portion and a second signal portion of the one-dimensional modulated optical signal. The first signal portion may be passed through a first branch including a first time delay component. The second signal portion may be passed through a second branch parallel to the first branch and including a second time delay component.

In block 830, a second optical coupler may receive time-delayed versions of the first and second signal portion that have passed through the first and second time delay components, respectively. The two time delays may be different from one another. For example, one time delay may be shifted 90 degrees (½) from the other time delay.

In block 840, the second optical coupler may output a phase-folded version of the one-dimensional modulated optical signal. The phase-folded optical signal may have properties that allow it to be demodulated by a simplified one-dimensional vector receiver.

In block 850, a third optical coupler may receive the phase-folded version of the one-dimensional modulated optical signal and an output of a local oscillator. The local oscillator output may have a known phase and amplitude. Combining the phase-folded version of the one-dimensional modulated optical signal and the local oscillator signal may occur in the third optical coupler, which may be a 2×1 coupler.

In block 860, a homodyne or intradyne coherent receiver may receive an output of the third optical coupler. The received output may be converted from an optical signal to an electrical signal using a photodetector, then amplified using an amplifier, and then converted to a digital signal using an analog-to-digital converter. The resulting digital signal may be a representation of the output of the third optical coupler.

In block 870, a digital signal processor may process the digital signal. Processing the digital signal may involve a partial-response signal recovery algorithm, including but not limited to MLSE.

The example method of FIG. 8 describes phase folding for a modulated optical signal. In some examples, the phase folding may occur at a receiver end of a communication system, whereby the modulated optical signal received at the receiver was not phase-folded by the transmitter. Alternatively, the phase folding may occur at a transmitter end of a communication system, whereby the modulated optical signal received at the receiver is a phase-folded signal. In these examples, the operations of blocks 810-840 performed by the first and second optical couplers may be moved between the transmitter end and receiver end depending on the location of the phase folding operations. By contrast, the operations of blocks 850 and onward which are performed the third optical coupler and downstream therefrom are performed at the receiver end regardless of where the phase folding operations are performed.

The example method of FIG. 8 also describes performing only phase folding on a modulated optical signal. However, in other instances, the phase folding techniques of the present disclosure may be combined with polarization folding techniques in order to process polarization multiplexed signals using the same or similar DSP arrangement, such as is shown in the example of FIGS. 3 and 4. For example, the method may be modified to include splitting the optical signal between X-polarization and Y-polarization components, adding a time delay to one of the polarizations and mixing the X- and Y-polarization components (including the time-delayed component) in the first optical coupler. In such an example, the modulated optical signal sent through the first and second time delay components may be a polarization-folded modulated optical signal. In some examples, the combined polarization folding and phase folding may be used to produce 2-dimensional modulated optical outputs that can be detected and demodulated using a 2-dimensional vector receiver, such as the receiver 500 shown in the example of FIG. 5.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A coherent optical system comprising:
  a first optical coupler configured to receive a one-dimensional modulated optical signal and output a first signal portion on a first branch and a second signal portion on a second branch;
  a phase-folding time delay unit including at least a first time delay component positioned on the first branch and a second time delay component positioned on the second branch; and
  a second optical coupler configured to receive the first signal portion from the first branch and the second signal portion from the second branch and output a phase-folded version of the one-dimensional modulated optical signal capable of being demodulated by a one-dimensional vector receiver.

2. The system of claim 1, wherein the first optical coupler configured to receive a single-polarization pulse-amplitude modulated optical signal, whereby an output of the second optical coupler is a phase-folded version of the single-polarization pulse-amplitude modulated optical signal that is capable of being demodulated by a one-dimension vector receiver.

3. The system of claim 1, wherein the first time delay component applies a time delay equal to one or a multiple of a symbol period of the modulated optical signal, and wherein the second time delay component applies a time delay phase-shifted 90 degrees from the time delay of the first time delay component.

4. The system of claim 1, further comprising:
  a local oscillator of the receiver;
  a third optical coupler configured to combine the output of the second optical coupler with an output of the local oscillator;
  a photodetector configured to convert an output of the third optical coupler to an electrical signal;
  an amplifier configured to amplify the electrical signal;
  an analog to digital converter (ADC) configured to convert the electrical signal into digital form; and
  a digital signal processor (DSP) configured to execute a partial-response signal recovery algorithm on the electrical signal in digital form.

5. The system of claim 4, wherein the third optical coupler feeds the phase-folded version of the one-dimensional modulated optical signal to the DSP through only one photodetector, one amplifier and one ADC.

6. The system of claim 4, wherein the partial-response signal recovery algorithm comprises maximum likelihood sequence estimation (MLSE).

7. The system of claim 4, wherein the first optical coupler, the phase-folding time delay unit, and the second optical coupler are included in a receiver.

8. The system of claim 3, further comprising:

a polarization beam splitter configured to split the one-dimensional modulated optical signal into each of an X-polarized portion and a Y-polarized portion;

a polarization-folding time delay unit including at least a third time delay component positioned to apply a time delay to the X-polarized portion different from the time delays of the first and second time delay components, wherein an output of the polarization-folding time delay unit is connected to an input of the first optical coupler, wherein the output of the second optical coupler is both a polarization-folded and phase-folded version of the one-dimensional modulated optical signal and is capable of being demodulated by a one-dimensional vector receiver.

9. The system of claim 8, wherein the time delay of the third time delay component is a symbol period longer than the time delay of the first time delay component.

10. The system of claim 9, further comprising:

a local oscillator of the receiver;

a third optical coupler configured to combine the output of the second optical coupler with an output of the local oscillator;

a photodetector configured to convert an output of the third optical coupler to an electrical signal;

an amplifier configured to amplify the electrical signal;

an analog to digital converter (ADC) configured to convert the electrical signal into digital form; and a digital signal processor (DSP) configured to execute a partial-response signal recovery algorithm on the electrical signal in digital form.

11. The system of claim 10, wherein the third optical coupler feeds the polarization- and phase-folded version of the one-dimensional modulated optical signal to the DSP through only one photodetector, one amplifier and one ADC.

12. The system of claim 8, further comprising:

a local oscillator of the receiver;

a third optical coupler configured to split an output of the local oscillator;

a fourth optical coupler configured to receive a first portion of the output of the second optical coupler and a first portion of the output of the third optical coupler;

a fifth optical coupler configured to receive a second portion of the output of the second optical coupler and a second portion of the output of the third optical coupler; and a first photodetector configured to convert an output of the fourth optical coupler to a first electrical signal;

a first amplifier configured to amplify the first electrical signal;

a first analog to digital converter configured to convert the first electrical signal into digital form;

a second photodetector configured to convert an output of the fifth optical coupler to a second electrical signal;

a second amplifier configured to amplify the second electrical signal;

a second analog to digital converter configured to convert the second electrical signal into digital form; and a digital signal processor configured to execute a partial-response signal recovery algorithm on the first and second electrical signals in digital form.

13. The system of claim 12, wherein the system is further configured to receive a two-dimensional modulated optical signal, and output from the second optical coupler a polarization-folded and phase-folded version of the two-dimensional modulated optical signal that is capable of being demodulated by a two-dimensional vector receiver.

14. The system of claim 13, wherein the first optical coupler configured to receive a polarization-multiplexed pulse-amplitude modulated optical signal, whereby an output of the second optical coupler is a phase-folded version of the polarization-multiplexed pulse-amplitude modulated optical signal that is capable of being demodulated by a two-dimension vector receiver.

15. The system of claim 13, wherein the second optical coupler is configured to output respective orthogonal components of the polarization-multiplexed pulse-amplitude modulated optical signal to the fourth optical coupler and the fifth optical coupler.

16. The system of claim 1, wherein the first optical coupler, the phase-folding time delay unit, and the second optical coupler are included in a transmitter.

17. The system of claim 16, further comprising:

an optical signal source included in the transmitter and configured to output an unmodulated optical signal; and a one-dimensional modulator included in the transmitter and configured to modulate the unmodulated optical signal and output the one-dimensional modulated optical signal.

18. The system of claim 17, further comprising a receiver configured to receive the phase-folded version of the one-dimensional modulated optical signal from the second optical coupler, the receiver including:

a local oscillator;

a third optical coupler configured to combine the phase-folded version of the one-dimensional modulated optical signal with an output of the local oscillator;

a photodetector configured to convert an output of the third optical coupler to an electrical signal;

an amplifier configured to amplify the electrical signal;

an analog to digital converter (ADC) configured to convert the electrical signal into digital form; and a digital signal processor (DSP) configured to execute a partial-response signal recovery algorithm on the electrical signal in digital form.

19. A method, comprising:

receiving, by a first optical coupler, a one-dimensional modulated optical signal, outputting, by the first coupler, a first signal portion and a second signal portion of the one-dimensional modulated optical signal, wherein the first signal portion is passed through a first branch including a first time delay component and the second signal portion is passed through a second branch parallel to the first branch and including a second time delay component;

receiving, by a second optical coupler, a time-delayed version of the first signal portion and the second signal portion; and outputting, by the second optical coupler, a phase-folded version of the one-dimensional modulated optical signal that is capable of being demodulated by a one-dimensional vector receiver.

20. The method of claim 19, further comprising:

combining, by a third optical coupler, the phase-folded version of the one-dimensional modulated optical signal with an output of a local oscillator;

converting, by a homodyne or intradyne coherent receiver, an output of the third optical coupler to a digital signal; and executing, by a digital signal processor, a partial-response signal recovery algorithm on the digital signal.

\* \* \* \* \*